United States Patent
Tilli et al.

(10) Patent No.: US 7,313,247 B1
(45) Date of Patent: Dec. 25, 2007

(54) AUTOMOTIVE INTERIOR TRIM PANEL WITH INTEGRAL ACOUSTIC CHAMBER

(75) Inventors: Robert Tilli, Warren, MI (US); Benjamin Coon, Royal Oak, MI (US); Michael Whitens, Novi, MI (US); Zhibing Deng, Northville, MI (US); Chunhui Li, Troy, MI (US); Se Kyoon Shin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 10/908,006

(22) Filed: Apr. 25, 2005

(51) Int. Cl.
*H04R 25/00* (2006.01)

(52) U.S. Cl. .................. 381/389; 381/86; 381/386

(58) Field of Classification Search ............. 381/86, 381/87, 302, 332, 386, 389; 181/141, 150, 181/199; 49/502; 296/146.7; 264/40.1
See application file for complete search history.

(56) References Cited

U.S. PATENT DOCUMENTS

| | | | |
|---|---|---|---|
| 5,367,832 A | 11/1994 | Compeau et al. | |
| 5,736,689 A | 4/1998 | Van Hout et al. | |
| 5,927,020 A | 7/1999 | Kobrehel | |
| 5,936,818 A | 8/1999 | Maue et al. | |
| 6,226,927 B1 | 5/2001 | Bertolini et al. | |
| 6,615,475 B2 | 9/2003 | Berta et al. | |
| 6,615,546 B2 | 9/2003 | Furuyama et al. | |
| 6,676,879 B1 * | 1/2004 | Azima | 264/409 |
| 2001/0030078 A1 | 10/2001 | Jones et al. | |
| 2003/0053642 A1 | 3/2003 | Bank et al. | |

* cited by examiner

*Primary Examiner*—Huyen Le
(74) *Attorney, Agent, or Firm*—Gigette M. Bejin; Dickinson Wright PLLC

(57) ABSTRACT

An automotive interior trim panel includes a contoured panel having an interior surface forming a portion of a passenger compartment of a vehicle, and an exterior surface cooperating with an exterior body panel, such as a door, to define a first volume. A speaker port is formed in the contoured panel for locating a speaker within the first volume. A shell including an integral acoustic volume circumscribes a portion of the exterior surface of the contoured panel, including the speaker port. The shell is mounted to the exterior surface of the contoured panel so as to define an acoustic chamber supported by the contoured panel and extending within the first volume.

15 Claims, 4 Drawing Sheets

AUTOMOTIVE INTERIOR TRIM PANEL WITH INTEGRAL ACOUSTIC CHAMBER

BACKGROUND OF THE INVENTION

1. Field of the Invention

The present invention relates to an automotive trim panel construction in which a sealed acoustic chamber is integrated with a contoured interior panel.

2. Disclosure Information

Automotive closure structures are becoming increasingly complex due to a variety of competing demands. In the case of closure structures required to perform multiple duties, such as vehicle doors, consumers are becoming increasingly interested in higher-end audio systems having enhanced sound quality, while at the same time requirements relating to automotive energy usage place even more importance upon vehicle weight reduction. In the present case, the inventors provide, in the context of a vehicle door, not only superior audio quality, but also lower vehicle weight arising from the ability to eliminate the wiring and hardware required to mount two speakers in a location such as a vehicle's package tray. In certain cases, the present structure may be used as an alternative to the usual prior art side impact structure, or pelvic bolster, shown as a solid block of foam in FIG. 6 herein. Such foam, although offering a response to a side impact, contributes nothing to the vehicle's sound system. Known acoustic chambers, such as that shown in U.S. patent publication 2001/0030078A1 which shows an acoustic chamber having no capability regarding management of side impact force, also suffer from the deficiency that the chamber is generally not unitary, and is not integral with the door trim panel. As a result, the cost is high, the installation is difficult, and the audio results are inferior to the results produced by an acoustic structure according to the present invention.

SUMMARY OF THE INVENTION

An automotive interior trim panel includes a contoured panel having an interior surface forming a portion of the passenger compartment of the vehicle, and an exterior surface cooperating with an exterior body panel to define a first volume. The exterior body panel may be formed from stamped metal or from molded plastics, or from other materials processed according to methods known to those skilled in the art and suggested by this disclosure.

A speaker port formed in the contoured panel locates a speaker within the first volume. The speaker is mounted at least partly within the speaker port and has a magnet portion extending into the first volume. A shell, including an integral acoustic volume, circumscribes a portion of the exterior surface of the contoured panel, including the speaker port. The shell is mounted to the exterior surface of the contoured panel so as to define both an acoustic chamber and a pelvic bolster supported by the contoured panel. A shell is preferably bonded about its entire periphery to the contoured panel. A portion of the shell is preferably bonded to the periphery of the speaker port. The pelvic bolster defined by the shell preferably has a plurality of hollow, tiered, force transmission segments. The shell may be ultrasonically welded on substantially its entire periphery to the contoured panel, such that the acoustic chamber is sealed. In other words, the acoustic chamber has a constant volume, which promotes excellent audio performance.

According to another aspect of the present invention, an automotive body structure includes a formed exterior panel and a contoured panel having an interior surface for defining a portion of a passenger compartment of the vehicle, and an exterior surface cooperating with the exterior panel to define a first volume. A speaker port is formed in the contoured panel and a speaker is located at least partly within the first volume. A unitary, combination pelvic bolster and acoustic chamber shell is mounted to at least a portion of the exterior surface of the contoured panel within the first volume, such that shell circumscribes the speaker port and defines a fixed tuning volume behind the speaker, with the pelvic bolster formed as an integral, hollow, multiplanar member for transmitting lateral impact force through the contoured panel and into the pelvic region of an occupant of the vehicle. In essence, the multiplanar force transmitting member itself is a portion of the fixed tuning volume.

It is an advantage of an automotive trim panel according to the present invention that because the combination acoustic shell and impact force transmitting member is supported by a contoured panel defining substantially the entire interior surface of the trim panel, the shell and contoured panel may be handled as a unitary structure, as opposed to the piecemeal, multipart devices shown in the prior art. Such prior art systems suffer from increased assembly labor costs, as well as the undesirable complexity associated with additional part numbers.

It is a further advantage of a trim panel according to the present invention that the audio performance capability of a vehicular sound system will be enhanced, while at the same time weight and cost are reduced through the elimination of unneeded speaker wiring and mounting brackets and other hardware.

It is yet a further advantage of a trim panel according to the present invention that superior sound quality may be provided in a vehicle, such as a pickup truck or convertible, lacking a package tray suitable for mounting speakers, particularly subwoofers.

It is yet a further advantage of a trim panel according to the present invention that because the present invention allows subwoofers to be mounted within the vehicle's doors or other side panels, the space available within the vehicle's trunk will be increased, while at the same time weight and cost are reduced.

It is yet a further advantage of a trim panel according to the present invention that the present placement of the subwoofers or other speakers, in proximity to the driver's and front seat passenger's heads, and backed by a large sealed volume, produces superior audio performance.

It is yet a further advantage of a trim panel according to the present invention that the side impact response may be adjusted by changing the parameters of an engineered structural member incorporated into the acoustic shell.

Other advantages, as well as features and objects of the present invention, will become apparent to the reader of the following specification.

DETAILED DESCRIPTION OF PREFERRED EMBODIMENTS

Figure 1:
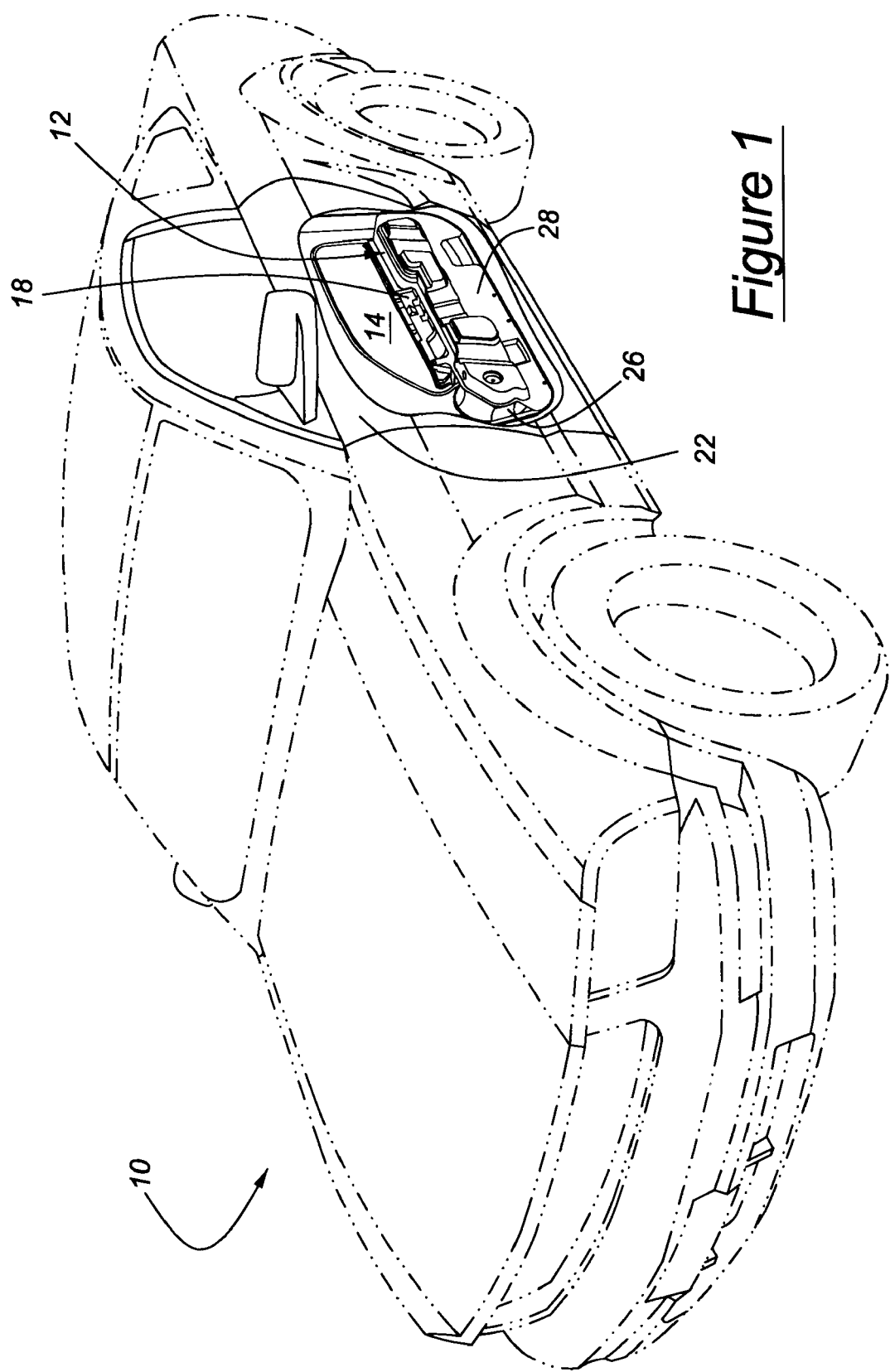
FIG. 1 is a ghost perspective view of a vehicle having a door trim panel according to the present invention.
Figure 5:
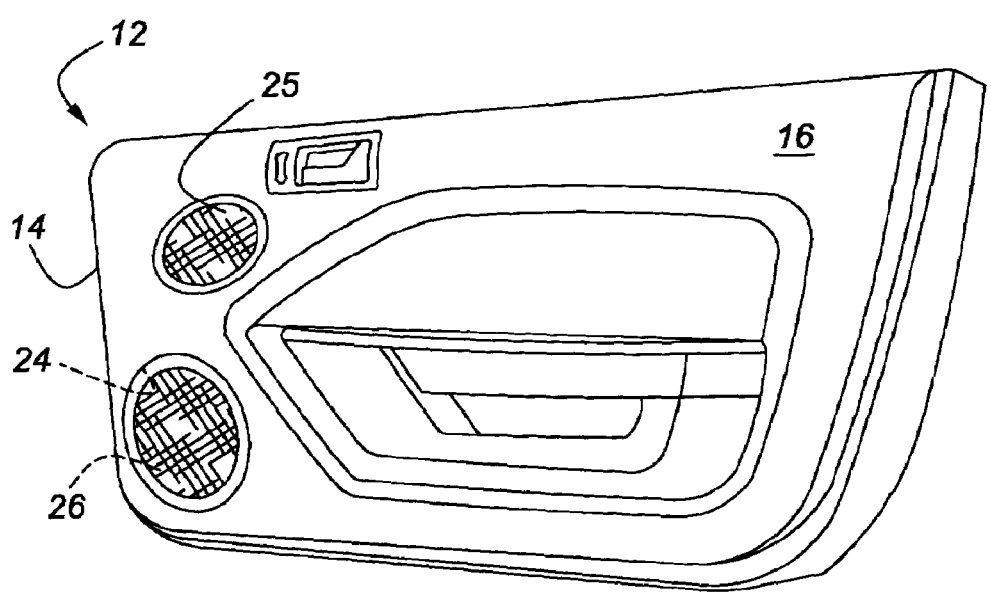
FIG. 5 illustrates the interior portion of a door trim panel according to the present invention.

As shown in FIG. 1, vehicle 10 has an interior trim panel 12 including a contoured panel 14. Panel 12 and door panel 22 define a first volume within the door. Speaker 26 and acoustic shell 28 are also shown in FIG. 1. FIG. 5 shows the interior surface, 16, of trim panel 12, clearly showing speaker 26, and a second speaker, 25, which are mounted in contoured panel 14.

Figure 2:
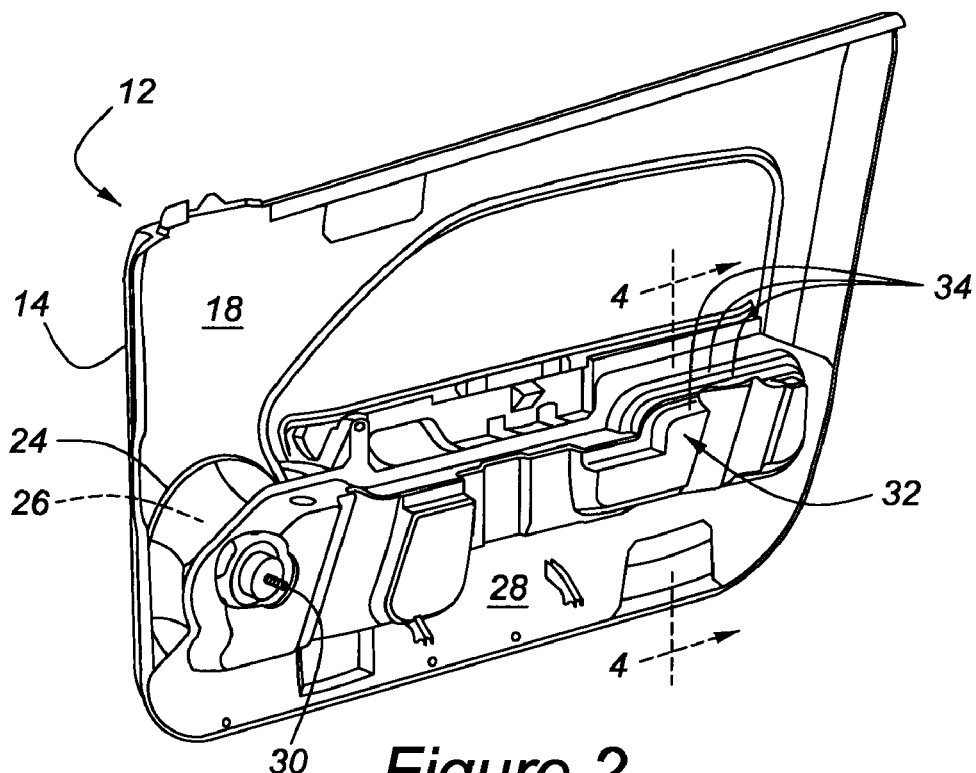
FIG. 2 is a perspective view of the exterior portion of a door trim panel according to the present invention.

As shown in FIG. 2, acoustic shell 28 is applied to exterior surface 18 of contoured panel 14. Acoustic shell 28 is bonded about substantially its entire periphery P, shown in FIG. 3, to exterior surface 18 of contoured panel 14. The bonding of shell 28 to contoured panel 14 may be accomplished by friction welding, or solvent welding, or fusion welding, or by ultrasonic welding or other types of bonding techniques known to those skilled in the art and suggested by this disclosure. In any event, acoustic shell 28 circumscribes a portion of the exterior surface 18 of contoured panel 14, including speaker port 24, which is formed in contoured panel 14. Because acoustic shell 28 is bonded about its periphery, including that portion of its periphery associated with speaker port 24, acoustic shell 28 forms a sealed acoustic volume with exterior surface 18 of contoured panel 14. This tuning volume allows the manufacturer of a vehicle incorporating this novel structure to eliminate two sound system speakers, with an attendant weight savings of about 18 pounds, while producing superior audio performance and while increasing trunk space within the vehicle by eliminating the need for speaker mounted within the vehicle's rear seat package tray. This eliminates the need for additional wiring, hardware for mounting the speakers, and two complete acoustic enclosures mounted to the package tray. Speaker 26 is itself mounted to acoustic shell 38 by means of screw or stud 30, which extends through shell 28 and into the magnet portion of speaker 26.

Figure 3:
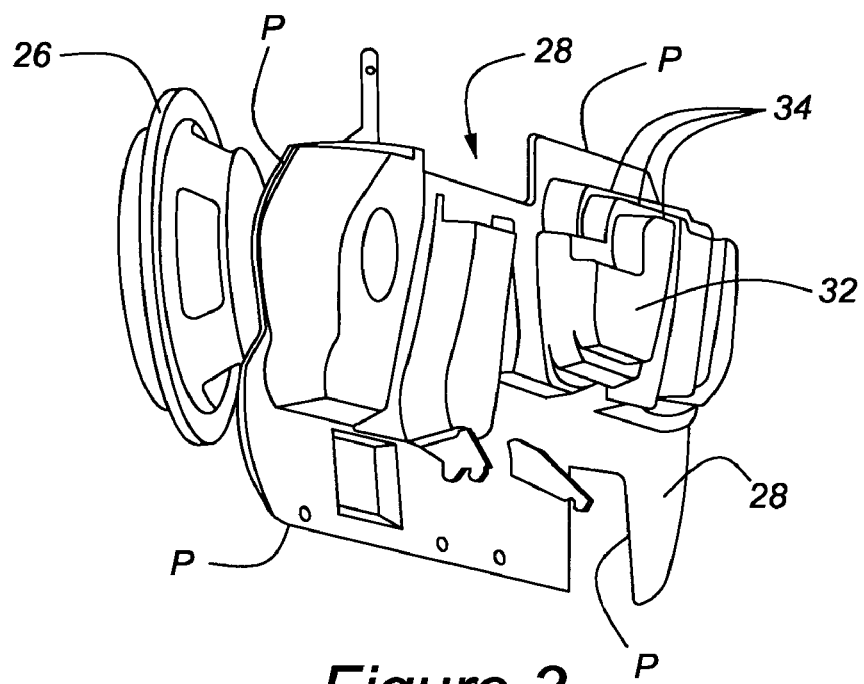
FIG. 3 is a perspective view of a combination acoustic shell, pelvic bolster, and speaker mount according to one aspect of the present invention.
Figure 4:
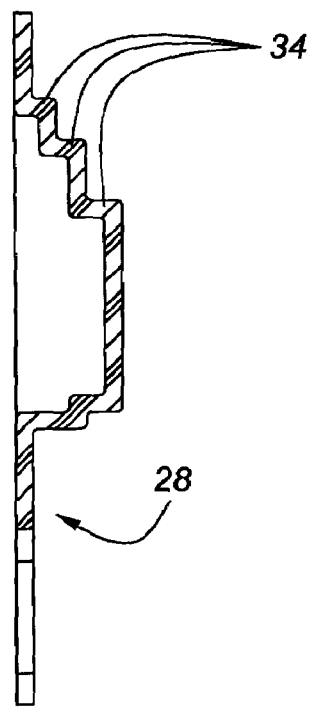
FIG. 4 is a section of the shell of FIG. 2, taken along the line 4-4 of FIG. 2.

FIG. 3 illustrates acoustic shell 28, incorporating pelvic bolster 32, which serves to distribute impact loads imposed upon door panel 22 of vehicle 10, to the pelvic region of an occupant sitting alongside the illustrated door of vehicle 10. Pelvic bolster 32 is constituted as a hollow, tiered force transmission device having a number of stacked multiplanar force transmitting members 34, which are shown with particularity in FIG. 4. Stacked members 34 are integral and unitary and are molded integrally with shell 28.

Shell 28 is preferably formed from plastic material commonly known as glass-filled polypropylene, with 12% rubber added to modify the cold ambient fragmentation performance of shell 28. Contoured panel 44 is preferably molded from polypropylene, so as to be compatible with acoustic shell 28. Those skilled in the art will appreciate in view of this disclosure that other types of materials may be used to form a contoured panel and acoustic shell according to the present invention.

Figure 6:
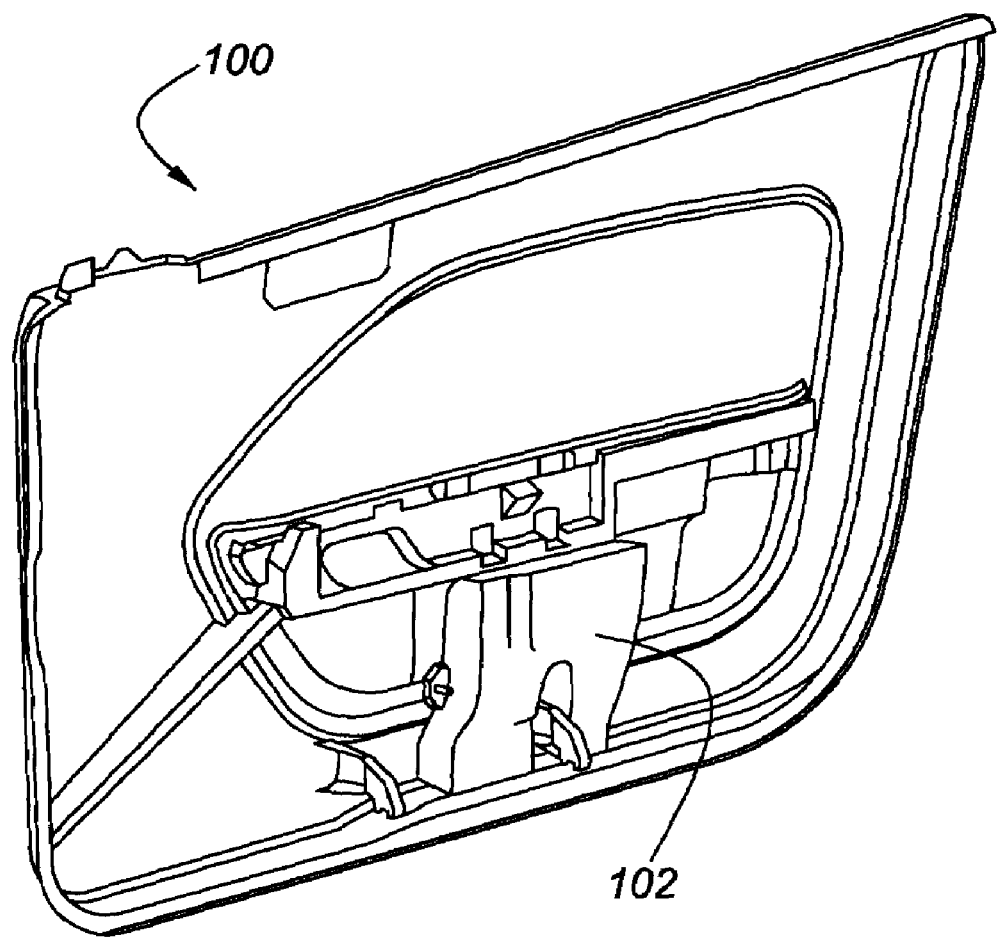
FIG. 6 illustrates a prior art door trim panel.

As noted above, FIG. 6 illustrates a prior art door trim panel, 100, having a pelvic bolster 102 which is a simply a block of foam which performs no acoustic function.

Those skilled in the art will appreciate in view of this disclosure that the present acoustic chamber may be employed without incorporating a pelvic bolster. Such a construction may be useful for automotive trim panels which are not subject to the force transmission requirements generally applicable to vehicle doors.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive interior trim panel, comprising:
   a contoured panel having an interior surface for a passenger compartment of a vehicle, and an exterior surface cooperating with an exterior body panel to define a first volume;
   a speaker port, formed in said contoured panel, for locating a speaker within said first volume;
   a speaker mounted to said speaker port and having a magnet portion extending into said first volume; and
   an integral acoustic shell circumscribing a portion of said exterior surface of said contoured panel including said speaker port, with said integral acoustic shell being sealingly mounted to the contoured panel so as to define a sealed acoustic chamber supported primarily by the contoured panel.

2. An automotive trim panel according to claim 1, wherein said acoustic shell is bonded about substantially its entire periphery to said contoured panel.

3. An automotive trim panel according to claim 1, wherein a portion of said integral acoustic shell is bonded to the periphery of said speaker port.

4. An automotive trim panel according to claim 1, wherein said acoustic shell is ultrasonically welded about substantially its entire periphery to said contoured panel.

5. An automotive trim panel according to claim 1, wherein said speaker is sealingly mounted to said speaker port.

6. An automotive trim panel according to claim 1, wherein said integral acoustic shell extends substantially the entire length of said contoured panel.

7. An automotive trim panel according to claim 1, wherein said exterior body panel comprises a door.

8. An automotive interior trim panel, comprising:
   a contoured panel having an interior surface defining a portion of the passenger compartment of a vehicle, and an exterior surface cooperating with an exterior body panel to define a first volume;
   a speaker port, formed in said contoured panel, for locating a speaker within said first volume;
   a speaker sealingly mounted to said speaker port and having a magnet portion extending into said first volume; and
   an integral acoustic shell, bonded about substantially its entire periphery to a portion of said exterior surface of the contoured panel, including the speaker port, so as to define a sealed acoustic tuning volume located within said first volume and circumscribed by said shell, by said contoured panel, and by said speaker, with said acoustic tuning volume being supported entirely by the contoured panel, with said port being in communication with said acoustic tuning volume.

9. An automotive trim panel according to claim 8, wherein said acoustic shell is friction welded to said contoured panel.

10. An automotive trim panel according to claim 8, further comprising a second speaker mounted within said contoured panel.

11. An automotive body panel, comprising:
   an exterior body panel;
   a contoured panel having an interior surface defining a portion of the passenger compartment of a vehicle, and an exterior surface cooperating with the exterior body panel to define a first volume;
   a speaker port, formed in said contoured panel, for locating a speaker within said first volume;

a speaker sealingly mounted to said speaker port and having a magnet portion extending into said first volume; and an integral acoustic shell, bonded about substantially its entire periphery to a portion of said exterior surface of the contoured panel, including the speaker port, so as to define a sealed acoustic chamber located within said first volume and supported by the contoured panel and by said exterior body panel, with said port being in communication with said acoustic chamber.

12. An automotive body panel, according to claim 11, wherein said speaker comprises a subwoofer.

13. An automotive body structure according to claim 11, wherein said contoured panel and said shell comprise polypropylene.

14. An automotive body structure according to claim 11, wherein said contoured panel comprises polypropylene said shell comprises glass-filled polypropylene.

15. An automotive body structure according to claim 11, wherein said shell comprises glass-filled polypropylene and rubber.

* * * * *